United States Patent [19]

Saunders

[11] Patent Number: 4,731,416
[45] Date of Patent: Mar. 15, 1988

[54] POLYURETHANE-TYPE ADHESIVES CONTAINING NONAQUEOUS SOLUTIONS OF ACRYLATE POLYMERS

[75] Inventor: Frank L. Saunders, Midland, Mich.

[73] Assignee: The Dow Chemical Company, Midland, Mich.

[21] Appl. No.: 872,736

[22] Filed: Jun. 10, 1986

Related U.S. Application Data

[63] Continuation-in-part of Ser. No. 655,795, Oct. 1, 1984, abandoned.

[51] Int. Cl.$^4$ ............................................. C08L 75/04
[52] U.S. Cl. ..................................... 525/131; 525/130
[58] Field of Search .............................. 525/131, 130

[56] References Cited

U.S. PATENT DOCUMENTS

| | | | |
|---|---|---|---|
| 3,028,367 | 4/1962 | O'Brien | 525/131 |
| 3,383,351 | 5/1968 | Stamberger | 524/762 |
| 3,405,162 | 10/1968 | Kuryla | 558/358 |
| 3,652,639 | 3/1972 | Pizzini et al. | 558/358 |
| 3,933,938 | 1/1976 | Rhodes et al. | 528/75 |
| 4,125,505 | 11/1978 | Critchfield et al. | 526/209 |
| 4,198,488 | 4/1980 | Drake et al. | 521/137 |
| 4,381,352 | 4/1983 | McBrayer | 521/115 |
| 4,404,324 | 9/1983 | Fock et al. | 525/123 |
| 4,578,426 | 3/1986 | Lenz et al. | 525/131 |

*Primary Examiner*—Lewis T. Jacobs
*Assistant Examiner*—A. Carrillo

[57] ABSTRACT

Substrates of metal, glass, plastic and the like are effectively bonded together with an adhesive composition which is the reaction product of an organic polyisocyanate such as 4,4'-methylenediphenyl diisocyanate, a solution of copolymer of an alkyl ester of an $\alpha,\beta$-ethylenically unsaturated carboxylic acid and a hydroxyalkyl ester of an $\alpha,\beta$-ethylenically unsaturated carboxylic acid in a polyahl having a molecular weight of 200 or greater such as polypropylene glycol and a low molecular weight polyahl such as ethylene glycol.

12 Claims, No Drawings

POLYURETHANE-TYPE ADHESIVES CONTAINING NONAQUEOUS SOLUTIONS OF ACRYLATE POLYMERS

CROSS-REFERENCE TO RELATED APPLICATION

This application is a continuation-in-part of application Ser. No. 655,795, filed on Oct. 1, 1984, now abandoned.

BACKGROUND OF THE INVENTION

This invention relates to polyurethane-type adhesives and their use in the bonding of substrates.

Polyurethane adhesives constitute a broad class of polymeric materials having a wide range of physical characteristics. These polymers are produced by the reaction of a polyisocyanate with a polyfunctional compound having active hydrogens in its structure. This active hydrogen compound is generally a liquid or solid capable of being melted at relatively low temperatures. Most commonly, the active hydrogen compound contains hydroxyl groups as the moieties having the active hydrogen and thus are termed polyols, e.g., the polyols of polyesters, polyester amides, or poly-ethers, or mixtures of two or more such materials. For reasons of commercial availability and cost, the polyols most commonly employed in the preparation of polyurethane adhesives are the poly-ethers having hydroxyl terminated chains and hydroxyl terminated polyesters.

Although a wide variety of physical and chemical properties are obtainable by the proper selection of a polyisocyanate and the polyol as well as the conditions under which the polyurethane reaction is carried out, the resulting polyurethane adhesives often do not adhere well to various substrates, e.g., vinyl polymers and the like, and often exhibit poor lap shear strength and poor impact strength.

Accordingly, it is highly desirable to provide a polyurethane adhesive exhibiting increased lap shear strength and/or impact strength.

SUMMARY OF THE INVENTION

In one aspect, the present invention is an adhesive composition comprising the reaction product of (1) a true solution of (a) a copolymer of an alkyl ester of an α,β-ethylenically unsaturated carboxylic acid and a hydroxyalkyl ester of an α,β-ethylenically unsaturated carboxylic acid, said copolymer having a number average molecular weight ($\overline{M}_n$) of at least 3500, in (b) a polyahl having a molecular weight of at least 200 (hereinafter called HMW Polyahl), (2) an organic polyisocyanate, and (3) a polyahl chain extender having a molecular weight less than 200, e.g., up to 180 (hereinafter called LMW Polyahl). By "true solution" it is meant a solution of the macromolecular polymer which is thermodynamically stable and reversible in the sense that the macromolecules are easily reconstituted after separation of solute from solvent. In the adhesive composition, the copolymer and the LMW Polyahl are present in an amount sufficient to provide the resulting adhesive with lap shear strength or impact strength in excess of that possessed by a similar adhesive which contains no copolymer.

In another aspect, this invention is a method for bonding two or more substrates which comprises applying the aforementioned adhesive composition to at least one of the substrates and then contacting the substrates under conditions such that the adhesive composition forms a layer between the substrates and in contact with at least one surface of each substrate in order to cure the adhesive thereby bonding the substrates together.

Surprisingly, the adhesive compositions of the present invention exhibit significantly improved lap shear strength and/or impact strength as compared to conventional urethane adhesive compositions. Accordingly, the adhesive compositions of the present invention are particularly effective in bonding substrates of materials such as steel, plastic materials and aluminum.

DETAILED DESCRIPTION OF REPRESENTATIVE EMBODIMENTS

The HMW Polyahl suitably employed as the solvent phase of the copolymer solution includes any organic compound having at least two active hydrogen moieties wherein the compound has a molecular weight of at least 200 and a hydroxy equivalent weight of at least 50, preferably at least 100. Preferably the HMW Polyahl is a polymer having at least two active hydrogen moieties, a molecular weight of at least 400 and a total of at least 5 monomeric units such as propylene oxide and ethylene oxide. HMW Polyahls that are suitably employed in preparing the ethylenic addition polymerizable adduct or reaction product of this invention are also sufficiently lyophilic to enable polymers of the adduct to stabilize dispersions of lyophobic polymers in nonaqueous liquids. Preferably, the HMW Polyahl is sufficiently similar in composition to the continuous phase such that it is soluble in the continuous phase. For the purposes of this invention, an active hydrogen moiety refers to a moiety containing a hydrogen atom which, because of its position in the molecule, displays significant activity according to the Zerewitnoff test described by Woller in the *Journal of The American Chemical Society*, Vol 49, p. 3181 (1927). Illustrative of such active hydrogen moieties are —COOH, —OH, —NH$_2$, =NH, —CONH$_2$, —SH and —CONH—. Typical HMW Polyahls include polyols, polyamines, polyamides, polymer-captans, polyacids and the like, particularly as exemplified in U.S. Pat. No. 4,394,491.

Of the foregoing HMW Polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group as well as those which contain an amino group and a —SH group may be used.

Polyether polyols which are most advantageously employed as the HMW Polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared from any known process such as, for example, the process disclosed in *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Shick, M. J., *Nonionic Surfactants*, Marcel Dekker, Inc., New York (1967) U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 100 to about 2000.

Other HMW Polyahls suitable for use in the adhesive compositions of this invention are described in U.S. Pat. Nos. 4,394,491; 4,269,945 and 4,396,729.

The copolymer employed in the practice of this invention is a copolymer of an alkyl ester of an α,β-ethylenically unsaturated monocarboxylic acid and a hydroxyalkyl ester of an α,β-ethylenically unsaturated monocarboxylic acid which copolymer is soluble in the polyahl being used in the adhesive composition. In addition to the alkyl ester and the hydroxyalkyl ester, the copolymer may also contain other ethylenically unsaturated monomers provided that such monomers do not render the copolymer insoluble in the polyahl or interfere with the reaction between the isocyanate moiety of the organic polyisocyanate and the active hydrogen moiety of the polyahl. Exemplary alkyl esters are the alkyl acrylates and alkyl methacrylates wherein alkyl has from 1 to 18 carbon atoms. Preferably, the alkyl ester is an alkyl acrylate such as butyl acrylate, ethyl acrylate, 2-ethylhexyl acrylate, butyl methacrylate, or other alkyl acrylates or methacrylates wherein alkyl has from 1 to 16 carbon atoms, with butyl acrylate being the most preferred. Examples of preferred hydroxyalkyl esters are hydroxyethyl acrylate, hydroxypropyl acrylate, hydroxybutyl acrylate, hydroxyethyl methacrylate or hydroxypropyl methacrylate, with hydroxyethyl acrylate being most preferred. Examples of suitable other ethylenically unsaturated monomers are aliphatic conjugated dienes such as butadiene and isoprene; monovinylidene aromatic monomers such as styrene, α-methyl styrene, ar-methyl styrene, ar-(t-butyl)styrene; ar-chlorostyrene, ar-cyanostyrene and ar-bromostyrene; α,β-ethylenically unsaturated carboxylic acids and anhydrides such as acrylic acid and methacrylic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned mono-adduct, many of which have heretofore been employed in the formation of copolymer polyols as described in U.S. Pat. Nos. 3,823,201 and 3,383,351. It is understood that mixtures of two or more of the aforementioned "other monomers" are also suitably employed in making the copolymer. Of the foregoing "other monomers", the monovinylidene aromatic monomers, particularly ar-(t-butyl)styrene are preferred.

Most preferred copolymers are copolymers of from about 45 to about 95 weight percent of the alkyl acrylate or alkyl methacrylate or mixture thereof, from about 5 to about 55 weight percent of the hydroxyalkyl acrylate and up to about 50 weight percent of another monomer such as ar-(t-butyl)styrene, styrene, or vinyl toluene.

The $\overline{M}_n$ is preferably in the range from about 4,000 to about 40,000, more preferably from 4,000 to 20,000, most preferably from 4,000 to 18,000. The $\overline{M}_n$ of the copolymer is determined by gel permeation chromatography.

The true solution of the copolymer in HMW Polyahl is advantageously prepared by dispersing the monomeric components of the copolymer in the HMW Polyahl and effecting addition polymerization by conventional free radical initiation techniques. Usually, the HMW Polyahl is added to the reactor which is equipped with a conventional mixing means such as a simple mechanical stirrer. The polymerization is then readily carried out by simultaneously adding at a steady or constant rate the monomeric mixture and a free radical catalyst to the HMW Polyahl under conditions sufficient to cause free radical addition polymerization and a uniform solution of the copolymer in the HMW Polyahl. The temperature of copolymerization is dependent upon the free radical initiator and is preferably in the range from about 25° C. to about 190° C., most preferably from about 50° C. to about 120° C., when an azotype catalyst is employed. Other polymerization processes, both continuous and batch, may be suitably employed. Examples of such other polymerization processes are described in U.S. Pat. No. 3,383,351 or U.S. Pat. No. 4,390,645.

Suitably, the concentration of polymerization catalyst is any amount sufficient to cause copolymerization of the monomers. Preferably, the concentration of catalyst is in the range from about 0.5 to about 5, more preferably from about 1 to about 3, weight percent based on the combined weight of the monomers.

Catalysts suitably employed in the practice of the polymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, t-butyl hydroperoxide, azobis(isobutyronitrile) as well as mixtures of such catalysts. Of the foregoing catalysts, azobis(isobutyronitrile) is preferred.

In addition to the foregoing catalysts, chain transfer agents such as mercaptans, e.g., dodecanethiol, and carbon tetrahalides such as carbon tetrachloride may be employed in conventional amounts to control molecular weight of the copolymerizate.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Preferred due to their availability and properties are tolylene diisocyanate, 4,4'-methyldiphenyl diisocyanate and polymethylene polyphenylisocyanate, with diphenyl-methane-4,4'-diisocyanate and liquid forms based thereon being most preferred. Also suitable are isocyanate terminated prepolymers such as those prepared by reacting polyisocyanates with polyols.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The undistilled or crude isocyanates are disclosed in U.S. Pat. No. 3,215,652.

The LMW Polyahls employed in the adhesive compositions of this invention include ethylene glycol, propylene glycol, butylene glycol, diethylene glycol, dipropylene glycol and the like, with ethylene glycol being most preferred. Low molecular polyamines such as ethylenediamine are also suitable, particularly when aliphatic polyisocyanates are employed.

In preparing the reaction product which constitutes the essential component of the adhesive compositions of the present invention, the solution of copolymer in HMW Polyahl, the LMW Polyahl and the polyisocyanate are contacted in proportions and under conditions sufficient to provide the desired urethane reaction product. In general, the HMW Polyahl, the LMW Polyahl and the polyisocyanate are employed in proportions sufficient to provide a stoichiometric or nearly stoichiometric ratio between the active hydrogen moieties of the HMW Polyahl, the LMW Polyahl and the active hydrogen moiety of the copolymer with the isocyanate moieties of the polyisocyanate. The LMW Polyahl and the copolymer are employed in the composition in amounts sufficient to provide an improvement of lap shear strength or impact strength over a polyurethane adhesive prepared from the reaction product of the HMW Polyahl and the polyisocyanate. Preferably, the composition comprises (1) a polyahl portion of (a) from about 10 to about 70 weight percent of the copolymer, most preferably from about 25 to about 60 weight percent; (b) from about 30 to about 88 weight percent of the HMW Polyahl, most preferably from about 40 to about 75 weight percent; and (c) from about 2 to about 20 weight percent of the LMW Polyahl, most preferably from about 5 to about 15 weight percent; and (2) a polyisocyanate portion having sufficient isocyanate moieties to react with essentially all of the active hydrogen moieties of the HMW Polyahl and the LMW Polyahl. Preferably, the polyisocyanate portion is present in sufficient amount to provide a mole ratio of isocyanate moiety to active hydrogen moiety in the range from about 0.8:1 to about 2:1, most preferably from about 1:1 to about 1.2:1.

The urethane reaction of isocyanate moieties and active hydrogen moieties is preferably carried out in absence of a urethane-type catalyst. However, when fast reaction time is desirable, e.g., less than 1 min., the urethane reaction is carried out in the presence of a urethane-type catalyst which is effective to catalyze the reaction of the active hydrogen moieties with the isocyanate moieties. When such faster reaction times are desired, the urethane catalyst is used in an amount comparable to that used in conventional urethane-type reactions, preferably in an amount from about 0.001 to about 5 weight percent based on the weight of the reaction mixture.

Any suitable urethane catalyst may be used including tertiary amines, such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-di-methyl-N',N'-methyl isopropyl propylenediamine, N,N-diethyl-3-diethylaminopropylamine, dimethylbenzylamine and the like. Other suitable catalysts are, for example, tin compounds such as stannous chloride, tin salts of carboxylic acids such as dibutyltin di-2-ethyl hexanoate, as well as other organometallic compounds such as are disclosed in U.S. Pat. No. 2,846,408.

In addition to the aforementioned ingredients used in the composition, the composition optionally contains other additives such as surface-active agents, stabilizers, fillers, pigments and the like. These optional components will be employed in amounts to provide the desired function as is known by the skilled artisan in urethane type adhesives.

In utilizing the adhesive composition of the present invention, the composition is applied to the substrates prior to or during the formation of the desired reaction product. The substrates to be bonded are then placed in contact with the adhesive composition interspersed between the substrates and the adhesive composition is permitted to react to form the desired reaction product. Methods of application of the adhesive composition to the substrate and carrying out the reaction to form the desired reaction product are those generally used in conventional urethane adhesive applications. Examples of substrates which are suitably bonded together in the practice of this invention are those of various metals, glass, plastic, wood, reinforced polymeric composites and rubber. It is further understood that substrates of different composition such as metal to plastic, glass to plastic and the like can also be bonded using the adhesive compositions of the present invention.

The following examples are given to illustrate the present invention and are not to be construed as limiting the scope thereof in any manner. All parts and percentages are by weight unless otherwise indicated.

EXAMPLE 1

A. Preparation of Copolymer Solution in Polyahl

Into a one-liter, three-neck flask equipped with a stirrer, thermometer, condenser, dropping funnel and a nitrogen source is charged 200 g of polypropylene glycol (diol) having an average molecular weight of 400. The polypropylene glycol is previously dried over a molecular sieve. While maintaining a nitrogen purge of the reaction flask the flask is heated to 90° C. and a mixture consisting of 156 g of butyl acrylate, 44 g of 2-hydroxyethyl acrylate and 2 g of azobis(isobutyronitrile) is added dropwise to the reaction flask over a period of 2½ hours. After 3 hours, 0.2 g of the azo catalyst is added to the reaction mixture and at subsequent ½ hour intervals a similar amount of the azo catalyst is added until a total of 1 g of additional azo catalyst is added. The total polymerization time is 5½ hours. The resulting reaction mixture is then stripped undevacuum, but no volatile components are recovered. The resulting copolymer in polypropylene glycol solution is a clear homogeneous liquid having a viscosity of 2000 centipoises at 23.5° C. (Brookfield Viscosity-Brookfield LVT Viscometer operating a #2 spindle at 6 rpm). The copolymer has a $\overline{M}_n$ of 5315 as determined by gel permeation chromatography and a peak molecular weight (Peak) of 10,634 and a weight average molecular weight of 10,803.

B. Urethane Adhesive

To 9 g of the aforementioned copolymer in one polypropylene glycol solution is added 1 g of ethylene glycol (previously dried) and the mixture is degassed under vacuum with stirring. While stirring the mixture, a portion of 11.73 g of carbodiimide modified 4,4'-methylenediphenyl diisocyanate (sold by Upjohn under the tradename Isonate ® 143) is added and the resulting mixture is again degassed with stirring. The resulting adhesive composition is then applied to tabs of cold rolled steel and aluminum, each tab having the following dimensions: 2.54 cm × 10.16 cm × 0.16 cm. The metal tabs are previously cleaned with perchloroethylene and oven-dried. The lap shear specimens are prepared by applying the adhesive mixture to the ends of one side of the metal tab and a few glass spheres having a diameter of 0.1 mm are placed on the adhesive. The adhesive joint is made with a 1.27 cm overlap and clamped. After a room temperature cure for about 24 hours, the tabs are then post-cured at 135° C. for 60 minutes. Lap shear strength is then measured using an Instron testing machine at a crosshead speed of 0.127 cm/minute. The average lap shear strength observed for 4 specimens of cold rolled steel is 5,140 psi (35.5 mPa). The average lap shear strength for 4 specimens of aluminum is 3,436 psi (23.7 mPa).

For purposes of comparison, similar lap shear samples are prepared using a mixture of 90 parts of the aforementioned polypropylene glycol and 10 parts of ethylene glycol in combination with the aforementioned diisocyanate at the same ratio of NCO to OH employed hereinbefore. In essence, the only difference between the two compositions is the presence of the copolymer in the first composition and the absence of the copolymer in this composition. The average lap shear strengths for the resulting specimens are 3,400 psi (23.5 mPa) for cold rolled steel and 2,746 psi (18.9 mPa) for aluminum.

EXAMPLE 2

Following the procedure desoribed in part A of Example 1, the following copolymer solutions are prepared at a concentration of 50 weight percent of copolymer in the polyglycol. The polyglycol used is the polyglycol of Example 1.

TABLE I

| Sample | Copolymer[1] Monomer | Copolymer[1] Weight Ratio | Viscosity[2] cps | $\overline{M}_n{}^3$ |
|---|---|---|---|---|
| 1* | BA/HEA | 78/22 | 2,000 (6) | 5315 |
| 2 | BA/HEA | 90/10 | 1,600 (12) | 5517 |
| 3 | BA/HEA | 50/50 | 8,700 (1.5) | NM |
| C₁** | None | | 90 (60) | |
| C₂** | BA | 100 | 305 (60) | |
| 4 | BA/HEA/AA | 75/22/3 | 4,000 (3) | NM |
| 5 | BA/HPA/AA | 75/22/3 | 4,700 (3) | NM |
| 6 | BA/S/HEA | 50/28/22 | 55,000 (0.3) | NM |
| 7 | BA/MMA/HEA | 50/28/22 | 36,000 (0.3) | NM |
| 8 | BA/tBS/HEA | 50/25/10 | 10,220 (1.5) | 7806 |
| 9 | BA/LMA/HEA | 50/25/10 | 1,895 (12) | 5233 |

*Example 1
**Not an example of the invention
[1]BA - butyl acrylate
HEA - hydroxyethyl acrylate
AA - acrylic acid
HPA - hydroxypropyl acrylate
S - styrene
MMA - methyl methacrylate
tBS - t-butylstyrene
LMA - lauryl methacrylate
[2]Brookfield Viscosity using a Brookfield LVT Viscometer and a #2 spindle at 23.5° C. and rpm as indicated in parenthesis
[3]Number average molecular weight as determined by gel permeation chromatography NM - not measured but believed to have $M_n$ in the range of 5,000-10,000

Using the procedures of Example 1 to prepare and test lap shear strength of adhesive compositions on cold rolled steel, the results given in Table II are obtained. Impact strength of the adhesive joints is measured and reported in Table II.

TABLE II

| Run No. | Sample No. | Copolymer/Polyahl Component[1] Weight Ratio of Polypropylene glycol to Copolymer | Copolymer/Polyahl Component[1] Weight of Copolymer/polyahl Component (g) | EG[2] g | NCO MDI[3] g | Adhesive Strength[4] Lap Shear psi | Adhesive Strength[4] Lap Shear (mPa) | Impact in-lb | Impact (J) |
|---|---|---|---|---|---|---|---|---|---|
| 1 | 2 | 50/50 | 9.0 | 1.0 | 8.90 | 4576 | (31.6) | 32 | (3.6) |
| 2 | 1 | 50/50 | 9.0 | 1.0 | 9.61 | 5140 | (35.4) | 23 | (2.6) |
| 3* | 3 | 50/50 | 9.0 | 1.0 | 11.26 | 3316 | (22.9) | 8 | (0.9) |
| C₁* | C₁* | 100/0 | 9.0 | 1.0 | 11.73 | 3400 | (23.4) | 12 | (1.35) |
| C₂* | C₂* | 50/50 | 9.0 | 1.0 | 7.31 | 690 | (4.8) | 5 | (0.56) |
| 4 | 4 | 50/50 | 9.0 | 1.0 | 9.61 | 5344 | (36.9) | 10 | (1.13) |
| 5 | 8 | 50/50 | 9.0 | 1.0 | 8.90 | 5000 | (34.5) | 40 | (4.5) |
| 6 | 9 | 50/50 | 9.0 | 1.0 | 8.90 | 4530 | (31.3) | 30 | (3.4) |

TABLE II-continued

| | | Copolymer/Polyahl Component[1] | | | | Adhesive Strength[4] | | | |
|---|---|---|---|---|---|---|---|---|---|
| | | Weight Ratio of | Weight of | | | Lap | | | |
| Run No. | Sample No. | Polypropylene glycol to Copolymer | Copolymer/polyahl Component (g) | EG[2] g | NCO MDI[3] g | Shear psi | (mPa) | Impact in-lb | (J) |

Footnotes:
*Not an example of the invention
[1]Copolymer/polypropylene glycol as HMW Polyahl wherein the copolymer and polypropylene glycol are as defined in Table I
[2]Ethylene glycol as LMW Polyahl
[3]4,4'-methyl diphenyldiisocyanate sold as Isonate ® 143 by Upjohn
[4]Lap shear determined by method described in Example 1. Impact strength determined by the following drop impact test method: A Gardner Impact Tester is modified with a test specimen holder to accommodate standard 2.54 cm × 10.16 cm × 0.16 cm metal test specimens. Two test specimens indicated size are bonded together with the adhesive to form a cross-lap adhesive bond with a 2.5 cm² (1 in.) overlap (bond area) and bond thickness of 0.01 cm (0.004 in.). The bonded test specimen is clamped into test specimen holder which is secured to the base of the Gardner Impact Tester in a position so that the drop impact rod impinges on the center of the impacter part of the specimen holder. The steel rod impact weight (1.812 kg) is dropped from different heights onto impacter secured to the bonded test specimen and impact strength in inch-pounds (joules) is measured.

The results reported in Table II indicate that a significant improvement in lap shear strength and impact strength can be obtained over the control sample (Sample No. C₁) with copolymers of BA/HEA containing from 10 to 22 percent HEA and at a concentration of 50 percent of copolymer in the polypropylene glycol. Run No. 3 in Table II exhibits lower impact strength and lap shear due to excessive cross-linking in this particular formulation.

EXAMPLE 3

Following the procedure described in part A of Example 1, the following copolymer solutions are prepared except that polypropylene glycols (diols) having different molecular weights are employed. Each of the copolymer solutions contain 50 percent copolymer and is combined with ethylene glycol at a weight ratio of 90:10 and then with Isonate ® 143 at a NCO:OH ratio of 1.05. The resulting adhesive compositions are then tested for lap shear strength and impact strength by the methods described in Examples 1 and 2 and the results are reported in Table III. For purposes of comparison, the adhesive compositions containing the polypropylene glycol, ethylene glycol and Isonate ® 143 but no copolymer are similarly prepared and tested and the results are reported in Table III.

Similarly, several adhesive compositions are prepared using different amounts of ethylene glycol using the polypropylene glycol, copolymer and polyisocyanate used in Sample No. 2 of Table I. These compositions are also tested and the results are reported in Table III.

TABLE III

| | | Copolymer/Polyahl Component[1] | | | Adhesive Strength[4] | | | |
|---|---|---|---|---|---|---|---|---|
| | | Weight Ratio of Polypropylene | Weight of Copolymer/polyahl | | Lap Shear | | Impact | |
| Run No. | Polyglycol[2] | glycol to Copolymer | Component (g) | EG[3] g | psi | (mPa) | in-lb | (J) |
| 1 | 250 | 50/50 | 9.0 | 1.0 | 5506 | (38.0) | 20 | (2.26) |
| C₁* | 250 | 100/0 | 9.0 | 1.0 | 1750 | (12.0) | 8 | (0.90) |
| 2* | 1200 | 50/50 | 9.0 | 1.0 | 1756 | (12.1) | 30 | (3.39) |
| C₂* | 1200 | 100/0 | 9.0 | 1.0 | 1640 | (11.3) | 30 | (3.39) |
| 3 | 2000 | 50/50 | 9.0 | 1.0 | 1710 | (11.8) | 20 | (2.26) |
| C₃* | 2000 | 100/0 | 9.0 | 1.0 | 576 | (3.97) | 14 | (1.58) |
| 4 | 4000 | 50/50 | 9.0 | 1.0 | 1630 | (11.2) | 28 | (3.16) |
| C₄* | 4000 | 100/0 | 9.0 | 1.0 | 228 | (1.57) | 5 | (0.56) |
| 5 | 400 | 50/50 | 8.0 | 2.0 | 4550 | (31.4) | 8 | (0.90) |
| 6 | 400 | 50/50 | 8.5 | 1.5 | 4238 | (29.3) | 11 | (1.24) |
| 7 | 400 | 50/50 | 9.0 | 1.0 | 4570 | (31.5) | 32 | (3.62) |
| 8 | 400 | 50/50 | 9.5 | 0.5 | 2330 | (16.1) | 35 | (3.95) |
| C₅* | 400 | 50/50 | 10.0 | 0 | 762 | (5.26) | 23 | (2.59) |

*Not an example of the invention
[1]Same as [1] in Table I wherein the copolymer is BA/HEA (90/10)
[2]Polypropylene glycol (diol) having molecular weight as indicated
[3]Same as [2] in Table II
[4]Same as [4] in Table II As evidenced by the data of Table III, improved impact and lap shear strengths are exhibited by comparison of Run Nos. 1, 3 and 4 with Run Nos. C₁, C₃ and C₄. Little, if any, improvement is shown in comparison of Run No. 2 with Run No. C₂. Accordingly, Run No. 2 is not an example of the invention. However, by using a different copolymer or different concentration of ethylene glycol, some improvement may be observed when a polypropylene glycol having a molecular weight of 1200 is employed. Therefore, copolymer/polyahl comparisons exhibiting either lap shear strength or impact strength at least 10 percent better than comparative compositions containing no copolymer are considered to be examples of this invention. As evidenced by comparison of the adhesive strengths for Run Nos. 5–8 with Run No. C₅, the presence of a LMW Polyahl such as ethylene glycol in amounts from 5 to 20 percent based on the total copolymer/polyahl component significantly improves the adhesive strength of the adhesive compositions. The $\overline{M}_n$ of the polymers are not measured but are believed to be in the range from about 5,000 to 12,000.

What is claimed is:

1. An adhesive composition comprising the reaction product of (1) a true solution of (a) from about 10 to about 70 weight percent of a copolymer consisting essentially of (i) from about 45 to about 95 weight percent of an alkyl ester of an $\alpha,\beta$-ethylenically unsaturated ccarboxylic acid and(ii) from about 5 to about 55 weight percent of a hydroxyalkyl ester of an $\alpha,\beta$-ethylenically unsaturated carboxylic acid, in (b) from about 30 to about 88 weight percent of a polyahl having a molecular weight of at least 200, with (c) from about 2 to about 20 weight percent of a polyahl chain extender having a molecular weight less than 200, and (2) an organic polyisocyanate in an amount sufficient to react with essentially all of the active hydrogen moieties of the HMW polyahl and the LMW polyahl, said copolymer and polyahl chain extender being present in amounts effective to substantially increase the lap shear strength or impact strength over that of a comparable adhesive containing no copolymer, said copolymer having a number average molecular weight ($\overline{M}_n$) of at least 3500.

2. The composition of claim 1 wherein the alkyl ester is an alkyl acrylate or alkyl methacrylate wherein alkyl has from 1 to 4 carbons and the hydroxyalkyl ester is hydroxyalkyl acrylate or methacrylate and alkyl is ethyl or propyl and the polyahl is a polyalkylene glycol having a molecular weight of 250 to 500 and the polyahl chain extender is ethylene glycol or propylene glycol, said copolymer having a $\overline{M}_n$ from about 4000 to about 40,000.

3. The composition of claim 2 wherein the alkyl ester is butyl acrylate, the hydroxyalkyl ester is hydroxyethyl acrylate, the polyalkylene glycol is polypropylene glycol, the chain extender is ethylene glycol and the polyisocyanate is 4,4'-methyldiphenyl diisocyanate or a liquid mixture containing a predominant amount of said diisocyanate.

4. The composition of claim 1 which comprises (1) a polyahl portion of (a) from about 25 to about 60 weight percent of the copolymer, (b) from about 40 to about 75 weight percent of the polyahl having a molecular weight of at least 200, and (c) from about 5 to about 15 weight percent of the polyahl having a molecular weight less than 200; and (2) a polyisocyanate portion of an organic polyisocyanate wherein the ratio of isocyanate moieties of the polyisocyanate portion to active hydrogen moieties of the polyahl portion are about stoichiometric.

5. The composition of claim 1 wherein the alkyl ester is an alkyl acrylate or alkyl methacrylate or a mixture thereof, and hydroxyalkyl ester is a hydroxyalkyl acrylate.

6. The composition of claim 4 wherein the extender is ethylene glycol, propylene glycol, butylene glycol, diethylene glycol or dipropylene glycol.

7. The composition of claim 6 wherein the extender is ethylene glycol.

8. The composition of claim 4 wherein the polyisocyanate is an isocyanate terminated prepolymer which is the reaction product of an organic polyisocyanate and a polyol.

9. The composition of claim 3 wherein the polyisocyanate is an isocyanate terminated prepolymer which is the reaction product of an organic polyisocyanate and a polyol.

10. The composition of claim 3 which comprises (1) a polyahl portion of (a) from about 25 to about 65 weight percent of the copolymer, (b) from about 30 to about 88 weight percent of the polypropylene glycol, and (c) from about 2 to about 20 weight percent of the ethylene glycol; and (2) a polyisocyanate portion of 4,4'-methyldiphenyl diisocyanate or a liquid mixture containing a predominant amount of said diisocyanate wherein the ratio of isocyanate moieties of the polyisocyanate portion to active hydrogen moieties of the polyahl portion are about stoichiometric.

11. An adhesive composition comprising the reaction product of (1) a true solution of (a) from about 10 to about 70 weight percent of a copolymer consisting essentially of (i) from about 45 to about 95 weight percent of an alkyl acrylate or alkyl methacrylate or mixture thereof, (ii) from about 5 to about 55 weight percent of a hydroxyalkyl acrylate, and (iii) up to 50 weight percent of another monomer or mixture of other monomers selected from the group consisting of aliphatic conjugated dienes, monovinylidene aromatic monomers, $\alpha,\beta$-ethylenically unsaturated carboxylic acids, $\alpha,\beta$-ethylenically unsaturated nitriles and amides, vinyl esters, vinyl ethers, vinyl ketones, and vinyl and vinylidene halides, in (b) from about 30 to about 88 weight percent of a polyahl having a molecular wieght of at least 200, with (c) from about 2 to about 20 weight percent of a polyahl chain extender having a molecular weight less than 200, and (2) an organic polyisocyanate in an amount sufficient to react with essentially all of the active hydrogen moieties of the HMW polyahl and the LMW polyahl, said copolymer and polyahl chain extender being present in amounts effective to substantially increase the lap shear strength or impact strength over that of a comparable adhesive containing no copolymer, said copolymer having a number average molecular weight ($\overline{M}_n$) of at least 3500.

12. The composition of claim 11 wherein said other monomer is t-butylstyrene, styrene or vinyl toluene.

* * * * *